United States Patent [19]
Angus

[11] Patent Number: 5,865,296
[45] Date of Patent: Feb. 2, 1999

[54] POWDER LIFTING DISC

[75] Inventor: James William Angus, Glossop, United Kingdom

[73] Assignee: Angus Powderflight Ltd., Derbyshire, United Kingdom

[21] Appl. No.: 25,146

[22] Filed: Feb. 18, 1998

[30] Foreign Application Priority Data

Mar. 1, 1997 [GB] United Kingdom .................... 9704323

[51] Int. Cl.$^6$ .................................................. B65G 19/14
[52] U.S. Cl. ............................................. 198/716; 198/727
[58] Field of Search .................................... 198/716, 725, 198/727, 728, 729, 734

[56] References Cited

U.S. PATENT DOCUMENTS

| | | | |
|---|---|---|---|
| 2,756,866 | 7/1956 | Wilde, Jr. .......................... | 198/716 X |
| 3,722,664 | 3/1973 | Hart et al. ............................. | 198/716 |
| 5,186,312 | 2/1993 | Ambs et al. ........................... | 198/716 |

FOREIGN PATENT DOCUMENTS

| | | |
|---|---|---|
| 1511996 | 5/1978 | United Kingdom . |
| 2111935 | 7/1983 | United Kingdom . |

*Primary Examiner*—James R. Bidwell
*Attorney, Agent, or Firm*—William H. Holt

[57] ABSTRACT

A disc for a conveying apparatus for particulate or powder material is described. The disc comprises at least two body portions which, in use, may be joined about a driving ferrule which is operably engaged with a rope of the conveying apparatus, the at least two portions when joined defining an internal cavity in which the ferrule is received wherein the cavity includes a generally transversely disposed plate-shaped portion allowing elasticity of the cavity in the axial direction.

13 Claims, 3 Drawing Sheets

POWDER LIFTING DISC

The present invention relates to powder and particulate material conveying apparatus of the type where the material is moved through an inclined tube by an endless rope having discs attached thereto, the plane of the discs being orientated transversely to the axis of the rope.

In the type of apparatus with which the present invention is concerned, the discs are conventionally circular in planform and are fixed at a desired pitch distance from each other on the rope which is generally of multi-strand wire. The rope moves around at least two spaced-apart sprocket wheels having cut-outs at appropriate intervals in their peripheries to accommodated the discs. One of the sprockets being driven so as to move the rope and discs. Means by which the powder or particulate material is supplied to and discharged from the apparatus is known in the art and will not be elaborated upon further unless necessary to the understanding of the present invention.

There are several different designs of disc known in the art, two examples of which are described in GB 1 511 996 and GB 2 111 935.

The discs are generally assembled from two or more component parts so that they may be relatively easily attached to an endless wire rope. Such discs are described in the two prior art references mentioned above. Drive to the disc from the wire rope is usually effected by means of a ferrule which is swaged onto the rope so as to grip it firmly; the ferrule being received within a cavity in the assembled disc so as to provide drive thereto. A problem which exists with present designs of conveyor is that the accuracy of the mating swaged ferrule and disc cavity needs to be relatively high. The ferrule is generally swaged onto the rope thus deforming the ferrule and causing its length to increase. Where the increase in length is too much, the receiving cavity in the disc is sometimes too tight or small to accommodate the ferrule. This necessitates the allowance of a manufacturing tolerance on both the ferrule and the disc cavity which can result in excessive axial movement of the disc relative to the ferule, which in turn can lead to mismeshing on the sprocket wheels and consequent seizure of the conveyor.

The designs of disc shown in GB 1 511 996 and GB 2 111 935 are both extremely rigid and require the relatively large manufacturing tolerances described above to be employed. Furthermore, the designs shown in the two prior art references are both of complex geometrical form and require expensive moulding dies to form them.

It is an object of the present invention to provide a disc for the type of conveying apparatus in question which can accommodate small differences in ferrule length. It is a further object of the present invention to provide a disc which is more economically manufactured.

According to the present invention, there is provided a disc for moving particulate material through a tube of a conveying apparatus, the disc comprising at least two body portions which, in use, are joined about a driving ferrule which is operably engaged with a rope of said conveying apparatus, the at least two portions when joined defining an internal cavity in which the ferrule is received wherein the cavity includes a generally transversely disposed plate-shaped portion allowing elasticity of said cavity in the axial direction.

Preferably, there are two portions joined together about a diametral split plane or a split plane passing through the axis of the disc or rope.

The disc may also be provided with axially extending boss portions within which part of the overall cavity may be contained. The boss portions may also provide convenient means by which the at least two body portions may be permanently joined together by means for example of circlips or bands extending around the boss portions in the circumferential direction. Pips or other projections such as circumferentially directed ridges for example may be provided on the boss portions to prevent the retaining circlips or bands from becoming disengaged in the axial direction.

The cavity may comprise a central portion dimensioned and shaped appropriately to receive the ferrule per se, the plate-shaped cavity may be axially centrally disposed and extend radially outwardly of the central portion so as to define a somewhat "bellows" shaped overall cavity shape.

The plate-shaped portion may extend radially outwardly beyond the radial extent of the boss portions so forming thinned regions around the boss portions which endow the disc with limited flexibility in the axial direction.

The plate shape cavity of the present invention may not necessarily be circular in planform.

The disc of the present invention may be provided with a single, central aperture for receiving the rope and ferrule or may be provided with a plurality of apertures for a corresponding plurality of ropes such that discs of larger diameter and hence greater conveying capacity may be produced. In such an embodiment the plate-shaped cavity portion may be of circular, elongate or non-circular planform.

In addition to the advantage of allowing axial elasticity of the cavity, a further advantage of the disc of the present invention is that it allows secure retention of the two free ends of the rope which are joined together to form an endless rope. Ferrules or collets of "top hat" form may be fixed to each end of the rope, the flange portion of each ferrule being accommodated in the plate-shaped portion of the cavity. This allows the stresses to be dispersed more evenly over the disc than in earlier embodiments whilst still providing a stronger and more secure joint between the free ends.

Although conventional discs are circular in planform and the most easily produced conveying apparatus employs circular section tubes through which the discs move, it is possible for the discs and associated apparatus to be non-circular and have an oval shape for example. Thus, the discs of the present invention are not necessarily limited to circular planform shapes.

Preferably, the portions which assemble to form the disc of the present invention are identical thus reducing tooling and production costs.

Discs according to the present invention may be made of any materials and by any methods which are known for the manufacture of conventional discs.

In order that the present invention may be more fully understood, examples will now be described by way of illustration only with reference to the accompanying drawings, of which:

Figure 1:
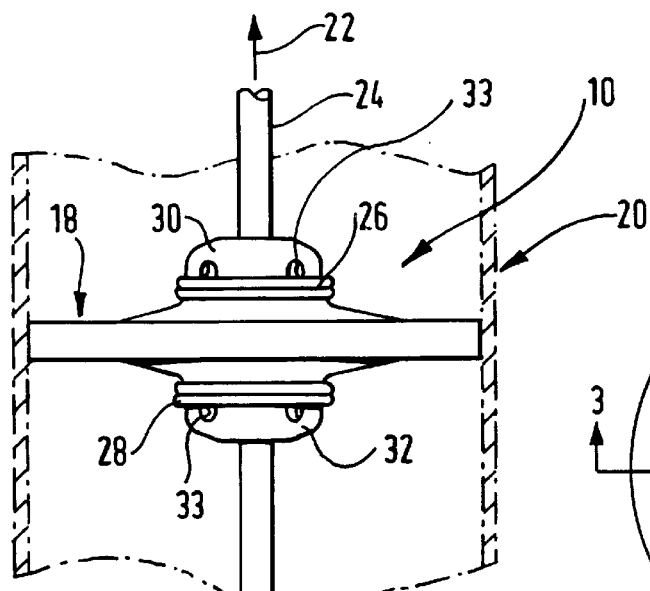
FIG. 1 shows a side elevation of a first embodiment of a disc according to the present invention positioned on a rope of a conveying apparatus.

Referring now to the drawings and where the same or similar features are denoted by common reference numerals.

Figure 2:
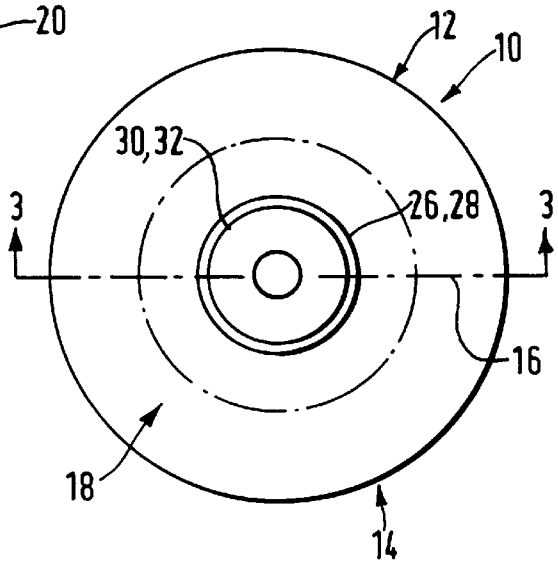
FIG. 2 shows the disc of FIG. 1 in planform.
Figure 3:
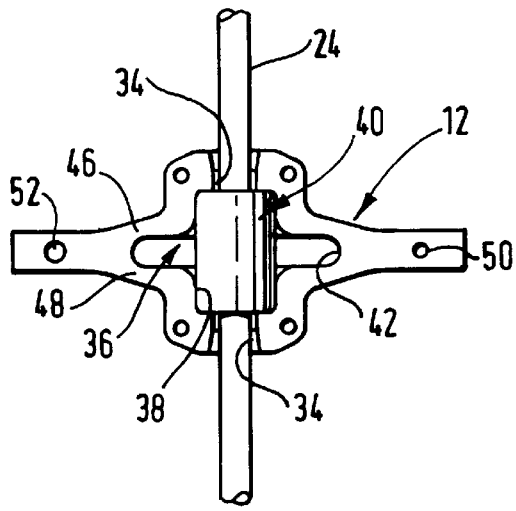
FIG. 3 shows a side elevation of one body portion on the line 3—3 of FIG. 2.
Figure 4:
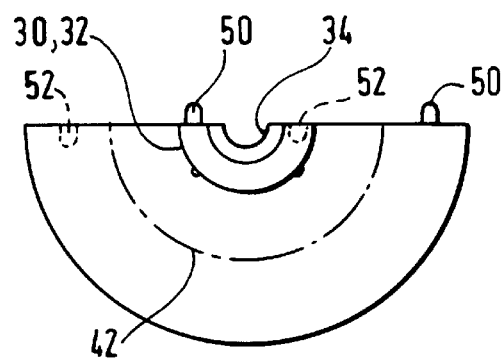
FIG. 4 shows a plan view of the body portion of FIG. 3.

FIGS. 1 and 2 show a first embodiment of a disc of the present invention and indicated generally at 10. The disc comprises two body portions 12, 14 having a diametral split plane 16, the body portions 12, 14 forming a circular, particulate material lifting disc 18. The disc 10 moves within a tube 20 (shown partially in dashed lines) of a particulate material conveyor apparatus (not shown) in the direction indicated by the arrow 22. The disc 10 is driven by a wire rope 24 to which the body portions 12, 14 are fastened by circlips 26, 28 extending around boss portions 30, 32. The boss portions are provided with moulded pips or other projection 33 to prevent the circlips from riding-up in the axial direction and becoming detached. The boss portions have an aperture 34 to receive the rope 24. FIG. 3 shows a view in elevation of the body portion 12 having the wire rope 24 in position. As may be seen from FIG. 3, the disc 10 has an internal cavity 36 comprising two main portions; a first portion 38 having a generally cylindrical shape for receiving a driving ferrule 40 swaged onto the wire 24; and, a second plate shaped portion 42 extending radially outwardly from the first portion 38 and being disposed substantially axially midway about the portion 38. The second cavity portion 42 is shown as a chain dashed line of circular shape in FIG. 4. In this embodiment the second portion 42 extends radially further outwardly than the radial extent of the boss portions 30, 32. The shoulder portions 46, 48 linking the boss portions to the halves of the disc 18 form a relatively thin and flexible ring, thus allowing axial movement of the boss portions 30, 32 and hence the first cavity portion 38 has flexibility in the axial direction so as to accommodate ferrules of slightly different lengths. The axial split plane 16 of the halves 12, 14 of the disc are provided with co-operating pegs 50 and sockets 52 for location purposes. Each half 12, 14 is formed by an identical, relatively simple moulding thus, making the disc of the present invention economic to manufacture.

A first example of a disc according to the present invention and of approximately 64 mm overall diameter moulded in Nylon 66 (trade name), having a boss diameter of about 23 mm, a ferrule cavity of about 12 mm diameter and about 22 mm length and having a plate-shaped cavity of about 31 mm diameter and about 6 mm axial length allows axial flexure of at least 0.5 mm which is sufficient to allow for the variation common in ferrule length on swaging.

In a second example of a disc according to the present invention and of approximately 85 mm overall diameter moulded in Nylon 66 (trade name), having a boss diameter of about 25.5 mm, a ferrule cavity of about 17 mm diameter and about 24 mm length and having a plate-shaped cavity of about 39 mm diameter and about 6 mm axial length, an axial flexure of at least 1 mm is provided and which is sufficient to allow for the variation common in ferrule length on swaging onto the wire sizes common for the size of conveying apparatus which utilises a disc of these dimensions.

Figure 5:
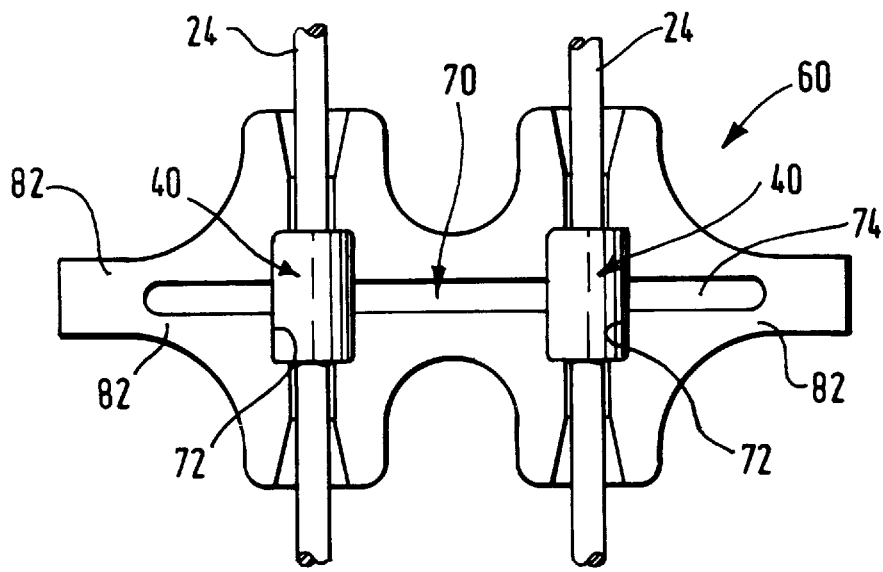
FIG. 5 shows an axial cross section through a second embodiment of a disc according to the present invention.
Figure 6:
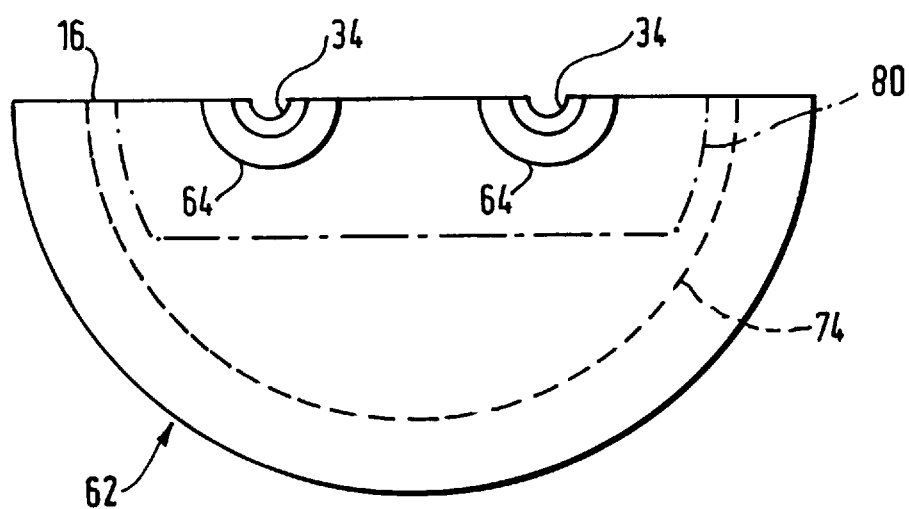
FIG. 6 shows a plan view of one body portion of the disc of FIG. 5; and, FIG. 7 which shows a disc according to the present invention in use to join the free ends of a rope of a conveying apparatus.

FIGS. 5 and 6 show a second embodiment of a disc 60 according to the present invention having a twin-rope drive to the disc; FIG. 5 showing a side elevation through a split plane 16 and a plan view in FIG. 6. This embodiment allows a conveying apparatus having a higher capacity to be manufactured since the drive to each disc 60 is effected by two wire ropes 24 and ferrules 40. The overall plan shape of the complete disc 60 is again circular but each half 62 is provided with two boss half portions 64 each having apertures 34 as in the embodiment shown with reference to FIGS. 1 to 4 and which will not be described again in detail. In this embodiment, the cavity 70 has three portions; two first portions 72 for receiving the ferrule 40; and, a second, plate-shaped portion 74 extending radially outwardly of the two portions 72 and also extending radially outwardly of the radial extent of the two boss portions 30, 32. The shape of the second portion 74 is typically a double semi-circle as indicated by the dashed line in FIG. 6. However, the shape of the second portion 74 may not necessarily be circular and may, for example, be elongate in plan form as indicated by the chain-dashed line 80 as shown in FIG. 6. Relatively thin and flexible shoulder portions 82 are again provided to impart axial flexibility to the cavity 70.

Figure 7:
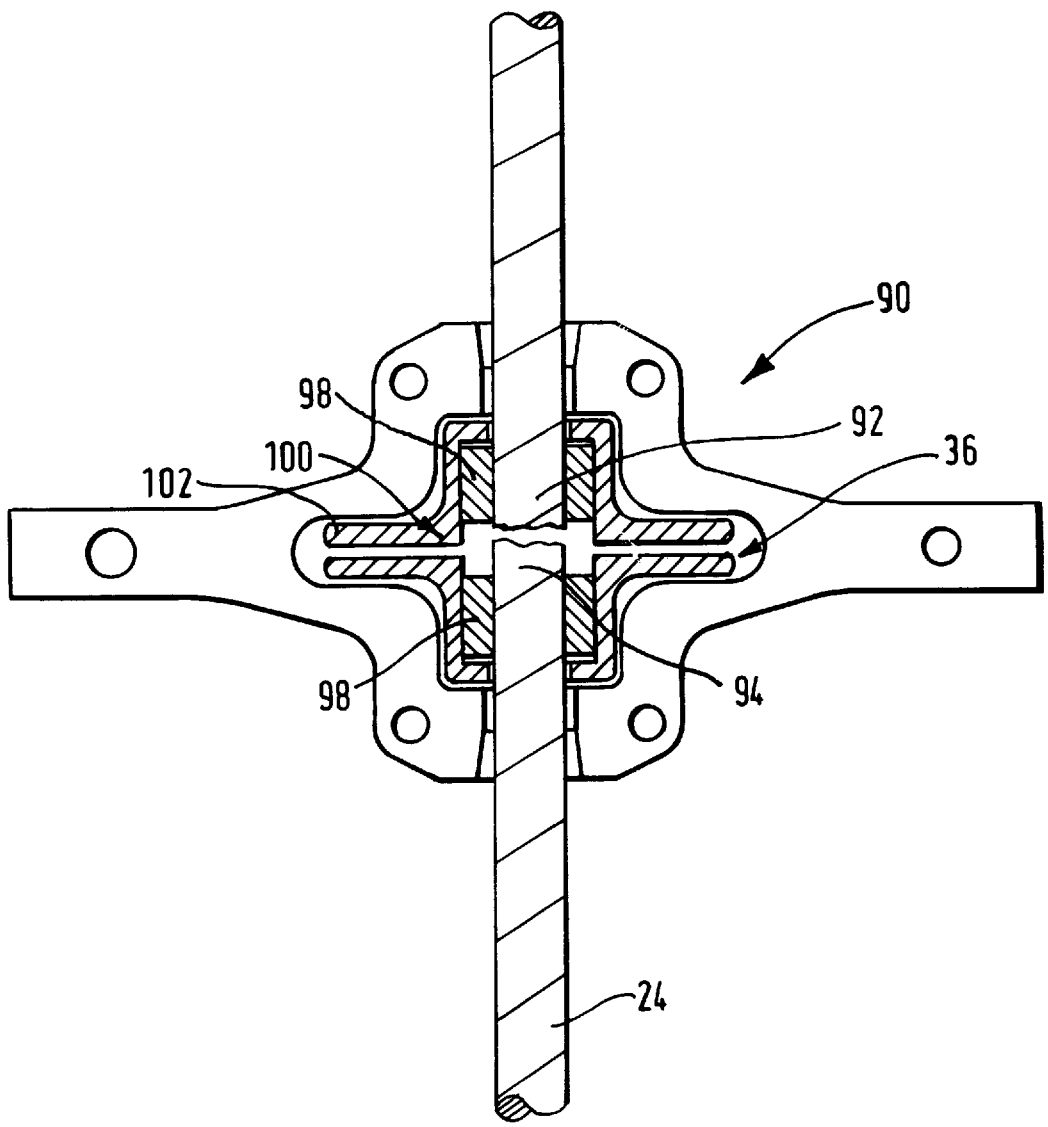

FIG. 7 shows a disc 90, similar to that described with reference to FIGS. 1 to 4 used to join two ends 92, 94 of a wire rope 24 into an endless configuration. The cavity 36 is used to receive the two ends of the rope each end having a ferrule 98 fixedly attached thereto. The ferrules are received in "top hat" shaped collets 100, the flange portion 102 of each collet being disposed in the plate-shaped cavity portion 42 so as to spread the imposed load and reduce stress. The flange portions 102 of the collets 100 effectively cancel the axial extendibility of the disc 90, which may be referred to as the "joining disc". Whilst axial elasticity is an advantage during standard disc assembly as described hereinbefore, it would be a hazard at the joining disc since it would allow an increase in the pitch length due to rope tension with the consequent risk of mis-meshing on the sprockets.

I claim:

1. A disc for moving particulate material through a conveying apparatus, the disc comprising at least two body portions which, in use, are joined about a driving ferrule which is operably engaged with a rope of said conveying apparatus, the at least two body portions when joined defining an internal cavity in which the ferrule is received wherein the cavity includes a generally transversely disposed plate-shaped portion allowing elasticity of said cavity in the axial direction.

2. A disc according to claim 1 wherein there are two body portions joined together about a diametral split plane.

3. A disc according to claim 1, the disc also being provided with axially extending boss portions within which at least a part of the cavity is contained.

4. A disc according to claim 3 wherein the boss portions are provided with circlips or bands extending around the boss portions in the circumferential direction to secure said body portions together.

5. A disc according to claim 3 wherein the plate shaped cavity extends radially outwardly of the radial extent of the boss portions.

6. A disc according to claim 4 wherein the plate shaped cavity extends radially outwardly of the radial extent of the boss portions.

7. A disc according to claim 1 wherein the cavity comprises a central portion dimensioned and shaped appropriately to receive a driving ferrule, the plate-shaped cavity being axially centrally disposed and extending radially outwardly of the central portion.

8. A disc according to claim 1 wherein the plate-shaped cavity is circular in planform.

9. A disc according to claim 1 and having a single, central aperture for receiving the rope.

10. A disc according to claim 1 provided with a plurality of apertures for a corresponding plurality of ropes.

11. A disc according to claim 1 wherein the body portions are identical.

12. A disc according to claim 1 wherein a particulate material lifting portion of the disc is substantially circular in planform.

13. A disc according to claim 12 wherein the each body portion has a substantially semi-circular particulate material lifting portion.

\* \* \* \* \*